US008649729B2

(12) United States Patent
Nightingale et al.

(10) Patent No.: US 8,649,729 B2
(45) Date of Patent: Feb. 11, 2014

(54) SYSTEM AND METHOD FOR PROVIDING BROADBAND INTERFERENCE AND ALLOWING COMMUNICATION THERETHROUGH

(75) Inventors: Stephen James Nightingale, Surrey (GB); George John Woloszczuk, Surrey (GB)

(73) Assignee: Cobham CTS Limited (GB)

( * ) Notice: Subject to any disclaimer, the term of this patent is extended or adjusted under 35 U.S.C. 154(b) by 404 days.

(21) Appl. No.: 13/134,000

(22) PCT Filed: Nov. 20, 2009

(86) PCT No.: PCT/GB2009/002716
§ 371 (c)(1),
(2), (4) Date: Jul. 6, 2011

(87) PCT Pub. No.: WO2010/070262
PCT Pub. Date: Jun. 24, 2010

(65) Prior Publication Data
US 2011/0263195 A1    Oct. 27, 2011

(30) Foreign Application Priority Data
Dec. 16, 2008  (GB) .................................. 0822967.6

(51) Int. Cl.
*H04K 3/00*    (2006.01)
(52) U.S. Cl.
USPC ........... 455/1; 455/63.1; 455/114.2; 455/220; 455/296; 375/350; 375/134
(58) Field of Classification Search
USPC ............... 455/1, 464, 9, 23, 501, 63.1, 67.13, 455/67.16, 69, 80, 114.2, 121, 220, 278.1, 455/280, 296, 562.1; 375/134, 130, 350, 375/346; 325/476, 60
See application file for complete search history.

(56) References Cited

U.S. PATENT DOCUMENTS

| | | | |
|---|---|---|---|
| 3,963,990 A * | 6/1976 | DiFonzo | 455/304 |
| 5,396,655 A * | 3/1995 | Saad | 455/295 |
| 6,339,712 B1 * | 1/2002 | Toivola | 455/562.1 |
| 6,351,216 B1 * | 2/2002 | Frederick et al. | 340/572.4 |
| 6,961,019 B1 | 11/2005 | McConnell et al. | |
| 7,899,106 B2 * | 3/2011 | Camp, Jr. | 375/134 |
| 2005/0031061 A1 * | 2/2005 | Ojard et al. | 375/346 |
| 2005/0031064 A1 * | 2/2005 | Kolze et al. | 375/350 |
| 2005/0239406 A1 * | 10/2005 | Shattil | 455/63.1 |
| 2006/0067381 A1 * | 3/2006 | Chakravarthy et al. | 375/130 |
| 2007/0201590 A1 * | 8/2007 | Kolze et al. | 375/350 |
| 2008/0039147 A1 * | 2/2008 | Shattil | 455/562.1 |
| 2009/0285343 A1 * | 11/2009 | Kolze et al. | 375/346 |
| 2011/0135044 A1 * | 6/2011 | Kolze et al. | 375/346 |

* cited by examiner

*Primary Examiner* — Tan Trinh
(74) *Attorney, Agent, or Firm* — Hovey Williams LLP

(57) ABSTRACT

A system and method are provided for transmitting a broadband interference signal and allowing communication through the transmitted interference signal. The system includes an interference transmitter for transmitting the interference signal, the interference transmitter having a transmitter feeder and a first antenna; a radio receiver for receiving a radio signal, the radio receiver having a radio feeder and a second antenna collocated with the first antenna of the interference transmitter; a steering signal generator for introducing at least one steering signal into the interference signal at the transmit feeder; a first directional coupler for sampling a portion of the interference signal that includes at least one of the steering signals; a negative feedback loop for adjusting the amplitude and phase of the sampled portion of the interference signal; and a second directional coupler for coupling the adjusted sampled portion of the interference signal into the radio feeder.

21 Claims, 3 Drawing Sheets

SYSTEM AND METHOD FOR PROVIDING BROADBAND INTERFERENCE AND ALLOWING COMMUNICATION THERETHROUGH

This patent application relates to the use of one or more steering signals positioned adjacent to a radio's signal of interest (SoI) channel to ensure that the maximum cancellation of interfering signal(s) occurs in the region where the steering signals are placed. This concept has application where the interfering signals extend over a broad band, for example broadband jamming signals, and where there is a requirement to receive one or more narrowband radio channels within the jamming band to enable communications through jamming to be achieved.

Many vehicles in use by military ground forces in current operations in theatre use a broadband interference system, also known as a "jammer", on the vehicle to ensure that any improvised explosive device (IED) with a radio-operated primer, or detonator, cannot be activated by the enemy when the vehicle is within a defined range of the IED, where it could sustain significant damage.

Previous interference cancellation systems have been provided for use when there was interference from co-sited radios, wherein several radios transmitted narrowband signals (typically over a 25 kHz channel) at different centre frequencies. Providing the levels received into the input of co-sited radios operating on receive could be reduced to below the desensitisation level, the rest of the interference rejection was achieved by filtering within the radio.

The present invention is concerned with providing a cancellation system that can deal with broadband jamming signals. However, there are some significant differences which make the existing system, developed for radios, unsuitable for use with broadband jamming signals.

Firstly, a problem with existing interference systems is that the broadband nature and the relatively high total power of the interference/jamming signals often cover the whole of the operating band of a radio, effectively disabling any radios on the same platform as the interference system by saturating their front end electronics, which means that communications cannot be maintained when a "jammer" is operating. Secondly, the jamming signals overlap the SoI or receive channel, which means that no benefit can be gained from the filtering/tuning properties of the radio.

Accordingly, it is necessary to first cancel the broadband interfering/jamming to a level where it does not desensitise the radio front end and then cancel the narrowband interfering/jamming signals over the bandwidth of the receive channel (typically 25 kHz) as much as possible. This has never been done before since, in the radio case, it had only previously been necessary to cancel narrowband down to around −55 or −60 dBm, which was quite sufficient. To communicate through broadband jamming signals, it is necessary to cancel to a much higher degree down to levels approaching the receiver noise, for example down to −126 dBm, since the greater the cancellation, the greater the radio sensitivity. This is extremely difficult to do. However, a solution to this problem is provided by the present invention.

According to the present invention there is provided a system for providing broadband interference and allowing communication therethrough, the system comprising: an interference transmitter for transmitting an interference signal, the interference transmitter having a transmitter feeder and a first antenna; a radio receiver for receiving a radio signal, the radio receiver having a radio feeder and a second antenna collocated with the first antenna of the interference transmitter; a steering signal generator for introducing at least one steering signal into the interference signal at the transmit feeder; sampling means for sampling a portion of the interference signal that includes at least one of the steering signals; adjusting means for adjusting the amplitude and phase of the sampled portion of the interference signal; and first coupling means for coupling the adjusted sampled portion of the interference signal into the radio feeder.

According to the present invention there is also provided a method for communicating through broadband interference, the method comprising the steps of: collocating an antenna of an interference transmitter for transmitting an interference signal and an antenna of a radio receiver for receiving a radio signal, the interference transmitter having a transmit feeder and the radio receiver having a receive feeder; introducing at least one steering signal into an interference signal at the transmit feeder; sampling a portion of the interference signal including at least one steering signal at the transmit feeder; adjusting the amplitude and phase of the sampled portion to be an exact anti-phase replica of the sampled interference signal; and introducing the adjusted sampled portion of the interference signal into the radio receiver's receive feeder to cancel the interference signal.

An embodiment of the present invention will now be described in detail with reference to the following figures, in which:

FIG. 1 is an illustration of a radio 1, according to an embodiment of the present invention, shown operating on 'receive' on the left hand side and a collocated broadband interference system 2 shown operating on 'transmit' on the right.

Figure 1:
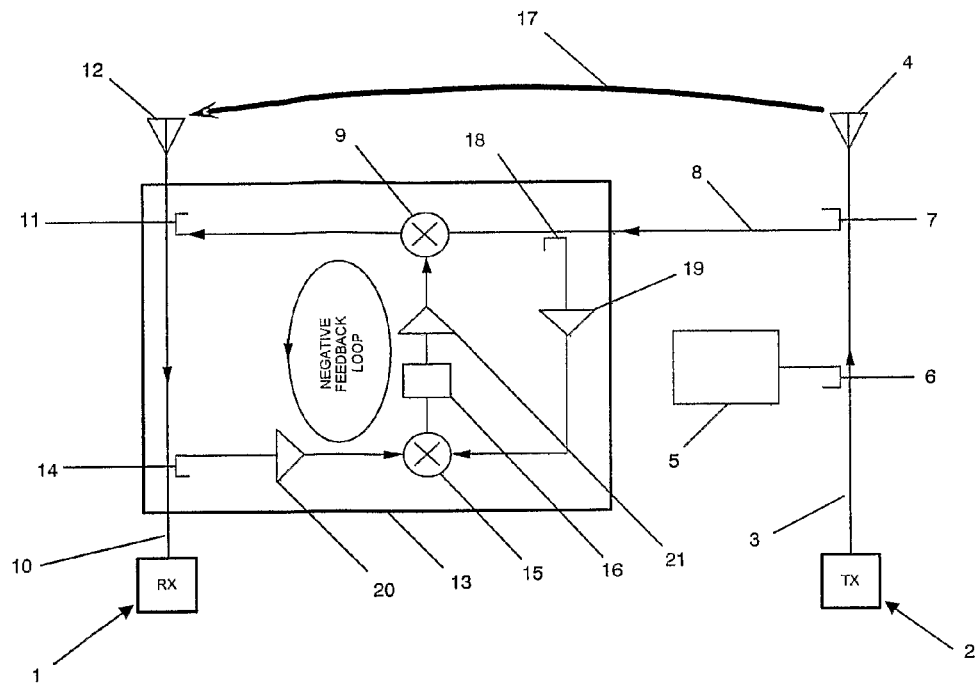
FIG. 1 shows a block diagram of an interference cancellation system according to the present invention.

The broadband interference system 2, shown on the right hand side of FIG. 1, comprises a 'transmit' feeder 3 for transmitting an interference signal via a "jammer" antenna 4 and further includes a steering tone generator 5, which introduces one or more steering tones to the interference signal via a steering tone injection coupler 6.

It will be understood that, although the embodiment of the present invention described herein uses steering tones, a number of other suitable steering signals may be used, for example simple signals, a multiplicity of signals, a modulated signal or series of signals, or a narrowband noise channel.

The interference signal, which includes one or more steering tones, is sampled by coupling off a proportion of the interference signal from the transmitter via a directional coupler, referred to herein as the "sample" coupler 7. The sample is then routed to a vector modulator 9 along a controlled coupling path 8 (which may also be referred to as the cancellation path), where it is adjusted in amplitude and phase before being injected into the 'receive' feeder line 10 via another directional coupler, referred to herein as the "cancellation" coupler 11. This provides an exact anti-phase replica signal to effect cancellation of the signal coupled into the radio's antenna 12.

The circuit which controls the cancellation process is referred to as a 'weight module' 13, because it applies the correct value or 'weight' to the amplitude and phase of the reference sample to effect optimum cancellation. One way of optimizing this process is by minimizing the residue after cancellation, which involves extracting the residue signal on the 'receive' feeder line via a directional coupler, referred to herein as the "residue" coupler 14, and using this residue signal to drive a negative feedback loop.

The negative feedback loop uses a correlator 15 to measure the similarity of the residue signal and a sample of the broadband interference signal, which is extracted from the controlled coupling path by a coupler, referred to herein as the "correlator sample" coupler 18. These two signals are amplified by low noise amplifiers (LNAs) 19, 20 and fed into the correlator 15. The output of the correlator is passed through a lowpass filter (LPF) 16 and a further low noise amplifier (LNA) 21 to provide controlling signals to adjust the vector modulator 9 to minimise the residue thereby maximising the cancellation effect.

The input signals to the correlator 15 from the amplifiers 19 and 20 may be fed via bandpass filters to improve the correlator discrimination and give improved cancellation performance from the weight module. These filters may be realised either in analogue or digital form and may be fixed or electronically variable. When digital filters are used, possibly in conjunction with a digital correlator, it will be necessary to ensure that the appropriate analogue to digital and digital to analogue convertors are used in order to interface these circuits with other circuit elements in the weight module.

There are two important points that need to be considered in the design of such systems. Firstly, any signal loss associated with the controlled coupling path 8 must be less than that of an antenna coupling path 17 between the interference system 2 and the radio 1, in order that sufficient signal may be injected into the 'receiver' feeder line 10 to effect cancellation. When the antenna coupling is very high, the loss of the antenna coupling path 17 may be less that that of the controlled coupling path 8, in which case either an amplifier can be introduced into the controlled coupling path 8 or an attenuator introduced into the antenna coupling path 17, i.e. on the SoI input. Secondly, in order to achieve broadband cancellation, the time delays of the antenna coupling path 17 and controlled coupling path 8 must be matched.

In the present invention, when cancelling high level interference signals, there are two stages of broadband cancellation: a first stage, which only requires a sample of the interference and does not make use of steering tones; and a second stage in the receive path where steering tones are used to maximise the cancellation over the SoI channel. Furthermore, the present invention recognises that if the level of interference signal coupled into the radio antenna 12 is below the desensitisation level of the radio front end, then the first stage of cancelling will not be necessary.

With the present invention, by introducing one or more steering tones into the feeder 3 of the interference system they experience the same time delay and amplitude phenomena as the actual interference, which ensures that the amplitude and phase settings of the vector modulator 9 can be optimised to maximise the cancellation of the steering tones. The close proximity of the steering tones together with the fact that they are of a higher amplitude than the interference signals ensures that the control loop will set the vector modulator 9 to provide maximum cancellation at the frequencies of the two steering tones and therefore at any other signals in close proximity.

The sensitivity of the radio 1 in the presence of the interference system 2 is defined entirely by how much cancellation can be achieved over the SoI channel. In general, the limitations in amplitude and phase tracking in components, together with typical environmental conditions, mean that it is only possible to cancel to a high level over a relatively narrow band. Therefore it is necessary to ensure that this occurs at the SoI channel frequency.

Although, in principle, a high level of cancellation could be achieved by using one steering tone in the centre of the SoI channel, in practice this would corrupt the information in the SoI channel. Therefore, it is preferred that two steering tones are used, spaced either side of the SoI channel.

Alternatively, a number of steering signals in a closely spaced frequency band could be used, either with several steering signals on either side or just on one side of the SoI, or one steering signal with some modulation scheme to spread the resultant signal over a narrow band or even some high level noise signal. However, whatever steering signals are used, they must only cover a narrow frequency band and must have an overall power level that is significantly higher than the signal level in the broadband interference/jamming signal.

The exact spacing must be optimised for the application, with the two steering signals being spaced beyond the filter skirts to ensure that the intermediate frequency (IF) filter or analogue to digital (A/D) filtering in the radio 1 rejects the steering signals to an adequate extent. Practical measurements have shown that the precise positioning and level of the steering tones is not particularly critical. It is also possible to use only one steering tone spaced away from the upper or lower filter skirt, but, generally, this will achieve slightly degraded cancellation performance over the SoI channel compared with the use of two steering tones.

The above concept can be extended to provide protection of one radio receiver 1 from several collocated interference systems 2 by using a separate weight module 13 to cancel the interference signal transmitted by each interference system 2. Such an approach could also be applied to each radio 1 collocated on the same platform as the interference systems 2.

Figure 2:
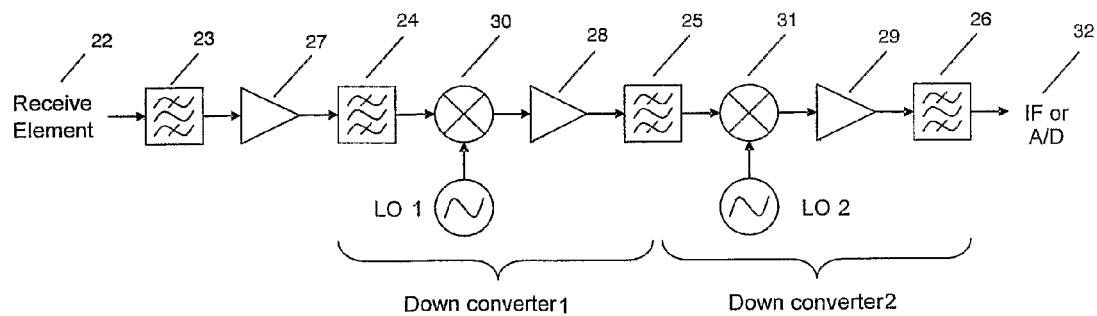
FIG. 2 is a block diagram of a typical radio front end.

FIG. 2 shows the front end of a typical radio 1, having two stages of frequency conversion. In this example, a signal received by a receive element 22 first passes through a frequency pre-selector 23 in the first front end stage, and then a Low Noise Amplifier (LNA) 27, before passing through two stages of frequency conversion 30, 31, each comprising further frequency pre-selection 24, 25, 26 and low noise amplification 28, 29 and on to an IF or A/D converter 32. The frequency pre-selection 23, 24, 25, 26 in the front end stages has the effect of restricting the band of signals passing through to the IF or A/D converter 32 to the overall operating band of the radio. However, the received signal is selected or defined by narrowband filtering at the output of the front end, the output being the IF or A/D converter 32.

The filter process can be achieved using either analogue or digital techniques. An analogue filter could be realised using lumped element capacitors and inductors or as a design using Surface Acoustic Wave (SAW) techniques. Digital filtering could be achieved by first converting the output analogue signal to a digital one using an Analogue to Digital (A/D) converter and then using a Finite Impulse Response (FIR) or Infinite Impulse Response (IIR) filter structure. This would typically be realised using a Field Programmable Gate Array (FPGA) or a Digital Signal Processor (DSP).

When a radio is tuned to a particular channel within its operating band, a broadband signal from an interference system may be large enough to overdrive the amplifier and mixer stages causing significant gain compression, harmonic and inter-modulation distortion leading to significant desensitisation. In the case of very high power signals, this can cause total blocking of required receive signal or SoI.

According to the present invention, interference is removed from a broadband interfering source in two stages, whereby each stage may be performed by a cancellation system of the type shown in FIG. 1. The SoI paths of the two stages are connected in series, wherein the output 10 from the first stage is fed directly into the input of the second stage. A sample of the interfering signal from the sample coupler 7 is split and fed to provide a reference sample to both stages. The cancellation process can be explained with reference to FIGS. 3 to 5, as follows.

Figure 3:
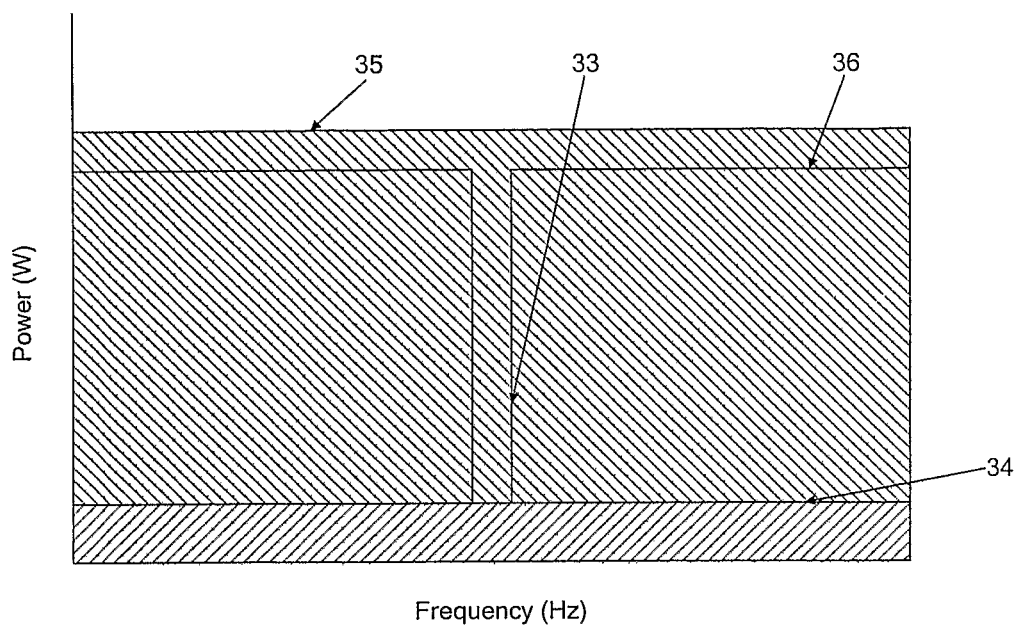
FIG. 3 shows a broadband jamming signal above the desensitization level of a typical radio front end before broadband cancellation.

FIG. 3 shows an example of a broadband jamming signal being applied to a typical radio front end before broadband cancellation according to the present invention. A narrowband region in the frequency band shows the receive or SoI channel 33. The system noise level 34 is broadband and is due to the electronic noise produced by the components used in the radio receiver. The power level of the interfering jamming signal 35 is broadband and clearly above the desensitization level 36 of the broadband radio front end, thereby desensitising or completely blocking the front end of the radio. This can significantly impede any signals of interest from a remote radio from reaching the IF or A/D 32 and therefore from being able to be processed by the following electronic stages in the radio.

Figure 4:
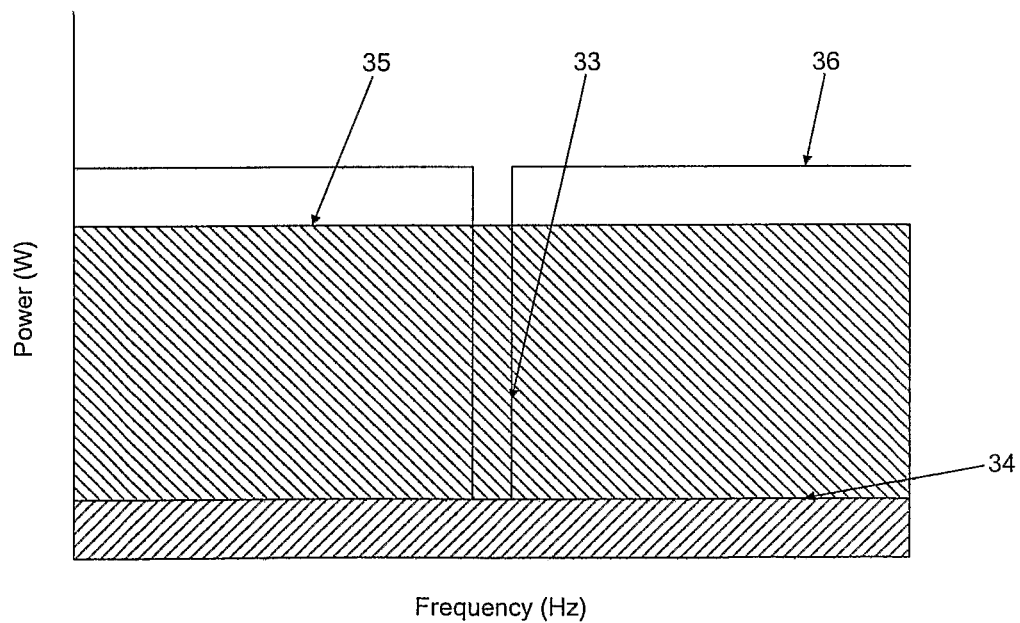
FIG. 4 shows interference between a collocated broadband interference system and a radio after a first stage of broadband cancellation according to the present invention.

FIG. 4 shows the power levels of the interfering jamming signal 35 following the first stage of broadband cancellation according to the present invention. It can be seen that the power levels have been reduced to below the desensitization level 36 of the radio front end, which now enables them to be processed by the IF or A/D and the following electronic stages in the radio.

Having restored the basic functionality of the radio in the first stage, the jamming signal must next be reduced as much as possible over the narrowband SoI channel 33, which is the desired receive channel, in the second stage, in order that the radio and its operator can distinguish the desired receive signal from the jamming signal.

Figure 5:
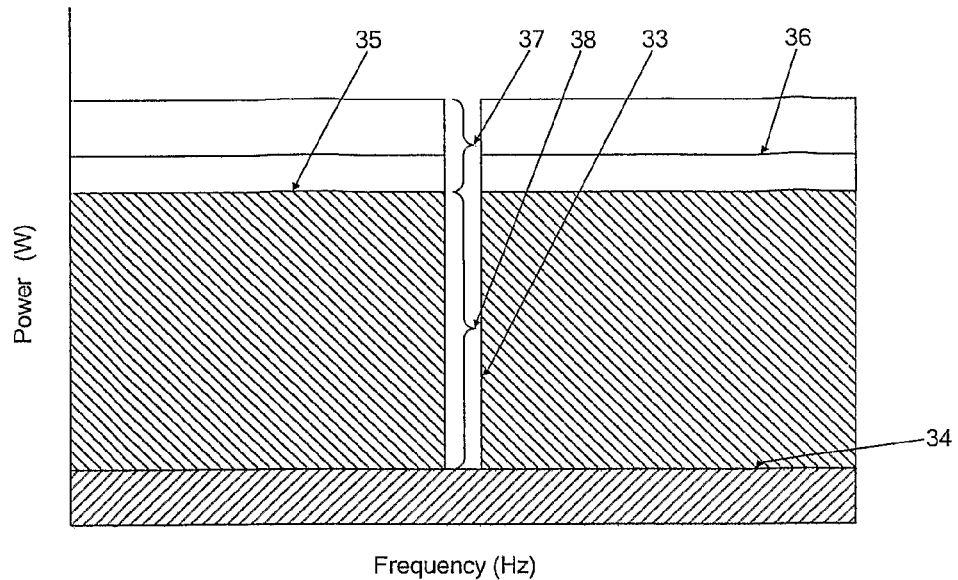
FIG. 5 shows interference between a collocated broadband interference system and a radio after a first stage broadband cancellation and a second stage narrowband cancellation according to the present invention.

FIG. 5 shows the situation after first stage of broadband cancellation 37 and the second stage of narrow band cancellation 38 have been performed according to the present invention, where the emphasis is on achieving the maximum cancellation possible over the SoI channel 33. Ideally, the second stage cancels the broadband jamming signal down to the system noise level 34, which determines the radio sensitivity. In practice, however, the second stage of cancellation will reduce the jamming signal over a narrowband to a significant extent, but it may not quite reach the system noise level due to noise and stability limitations in the control electronics.

Figure 6:
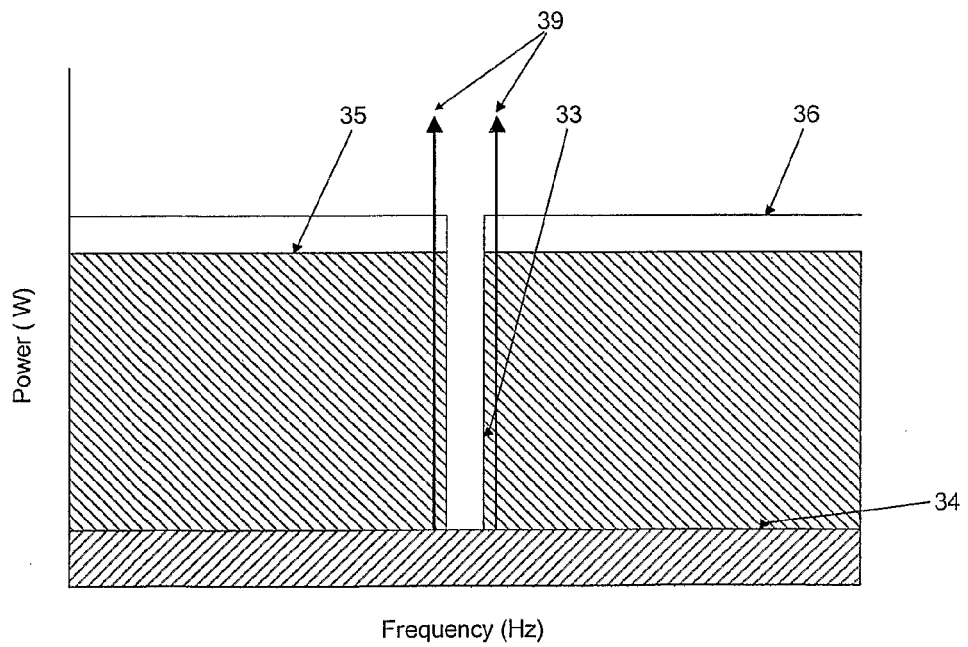
FIG. 6 shows maximum cancellation occurring in the SoI channel between steering signals.

FIG. 6 shows the relative signal levels of the cancelled interference and the steering tones 39 which are used to drive the control electronics in each stage. The steering tones are further used to ensure that the vector modulator 9 is set to provide maximum cancellation at the frequencies of the two tones and hence over the narrow band of the SoI channel between them. Since the jamming signal 34 and the two tones 39 follow the same coupling path 17, the jamming signal will be reduced or cancelled by the same amount as the two tones 39.

Due to the limitations in amplitude and phase tracking in components, together with typical environmental conditions, it is only possible to cancel to a high level over a relatively narrow band. Hence it is necessary to ensure that this occurs at the SoI channel frequency 33 by using steering tones 39.

One of the key features of the present invention is the introduction of the steering signals in a narrow frequency band either side of the SoI channel, with the steering tones being significantly larger than the broadband interference signal such that the steering signals define the setting of the vector modulator at frequencies that are close to them.

The techniques described above may be constructed as a multiplicity of circuits in a multi-chip module or as a single monolithic integrated circuit. The resulting module or chip could be readily incorporated into a miniature radio handset and radios where enhanced performance is required in a dense interfering or jamming environment and where platform constraints demand that emphasis is placed on minimising size, weight and power consumption. The techniques may also be used in conjunction with time-sliced jammers and radio systems to provide significant improvements in radio sensitivity and minimise the effects of switching transients, for example.

The invention claimed is:

1. A system for providing broadband interference and allowing communication therethrough, the system comprising:
   an interference transmitter for transmitting an interference signal, the interference transmitter having a transmitter feeder and a first antenna;
   a radio receiver for receiving a radio signal, the radio receiver having a radio feeder and a second antenna collocated with the first antenna of the interference transmitter;
   a steering signal generator for introducing at least one steering signal into the interference signal at the transmit feeder;
   sampling means for sampling a portion of the interference signal that includes at least one of the steering signals;
   adjusting means for adjusting the amplitude and phase of the sampled portion of the interference signal; and
   first coupling means for coupling the adjusted sampled portion of the interference signal into the radio feeder.

2. The system of claim 1, wherein the adjusting means comprises a negative feedback loop.

3. The system of claim 2, wherein the negative feedback loop comprises
   a second coupling means for extracting a residue signal from the radio feeder;
   a correlator for measuring the similarity of the residue signal and the sampled portion of interference signal; and
   a low pass filter for filtering out unwanted frequencies from the output signal received from the correlator.

4. The system of claim 3, wherein the sampling means, first coupling means and second coupling means are directional couplers.

5. The system of claim 3, wherein the sampled portion of the interference signal is adjusted by a vector modulator.

6. The system of claim 5, further comprising an amplifier provided along the path of the sampled interference signal.

7. The system of claim 6, further comprising an attenuator provided along a coupling path between the first antennas of the interference transmitter and the second antenna of the radio receiver.

8. The system of claim 7, wherein the steering signal is any one of a simple signal, a multiplicity of signals, a modulated single signal, or series of signals or a narrowband noise channel.

9. A method for communicating through broadband interference, the method comprising the steps of:
  collocating an antenna of an interference transmitter for transmitting an interference signal and an antenna of a radio receiver for receiving a radio signal, the interference transmitter having a transmit feeder and the radio receiver having a receive feeder;
  introducing at least one steering signal into an interference signal at the transmit feeder;
  sampling a portion of the interference signal including at least one steering signal at the transmit feeder;
  adjusting the amplitude and phase of the sampled portion to be an exact anti-phase replica of the sampled interference signal; and
  introducing the adjusted sampled portion of the interference signal into the radio receiver's receive feeder to cancel the interference signal.

10. The method of claim 9, farther comprising extracting a residue signal from the receive feeder after cancellation and using the residue signal together with the sampled portion of the interference signal to drive a negative feedback loop to optimise the cancellation effect.

11. The method of claim 10, further comprising boosting the adjusted sampled signal with an amplifier when the loss associated with a cancellation path is more than the loss associated with an antenna coupling path.

12. The method of claim 10, further comprising reducing the interference signal with an attenuator when the loss associated with a cancellation path is more than the loss associated with an antenna coupling path.

13. The method of claim 12, wherein the antenna coupling and cancellation paths have matching time delays.

14. The method of any one of claim 13, wherein two steering signals are introduced, the steering signals being spaced either side of a signal of interest (SoI) channel beyond filter skirts.

15. The method of claim 14, wherein the steering signal is any one of a simple signals, a multiplicity of signals, a modulated single signal or series of signals, or a narrowband noise channel.

16. A system for providing broadband interference and allowing communication therethrough, the system comprising:
  an interference transmitter for transmitting an interference signal, the interference transmitter having a transmitter feeder and a first antenna;
  a radio receiver for receiving a radio signal, the radio receiver having a radio feeder and a second antenna collocated with the first antenna of the interference transmitter;
  a steering signal generator for introducing at least one steering signal into the interference signal at the transmit feeder;
  a first directional coupler for sampling a portion of the interference signal that includes at least one of the steering signals;
  a negative feedback loop for adjusting the amplitude and phase of the sampled portion of the interference signal; and
  a second directional coupler for coupling the adjusted sampled portion of the interference signal into the radio feeder.

17. The system of claim 16, wherein the negative feedback loop comprises
  a third directional coupler for extracting a residue signal from the radio feeder;
  a correlator for measuring the similarity of the residue signal and the sampled portion of interference signal; and
  a low pass filter for filtering out unwanted frequencies from the output signal received from the correlator.

18. The system of claim 17, wherein the sampled portion of the interference signal is adjusted by a vector modulator.

19. The system of claim 18, further comprising an amplifier provided along the path of the sampled interference signal.

20. The system of claim 19, further comprising an attenuator provided along a coupling path between the first antenna of the transmitter and the second antenna of the radio receiver.

21. The system of claim 16, wherein the steering signal comprises any one of a simple signal, a multiplicity of signals, a modulated single signal or series of signals, or a narrowband noise channel.

* * * * *